2,789,121
Patented Apr. 16, 1957

2,789,121

CHLOROSULFONATION OF ORGANOSILICON COMPOUNDS

Glenn D. Cooper, Schenectady, N. Y., assignor to General Electric Company, a corporation of New York No Drawing. Application February 4, 1954,
Serial No. 408,285

17 Claims. (Cl. 260—448.2)

This invention relates to a process for making organosilicon compounds containing a chlorosulfonyl radical ($-SO_2Cl$) attached to silicon through aliphatic carbon, which process comprises effecting reaction between a chlorosulfonatable organosilicon compound and sulfuryl chloride in the presence of catalytic amounts of chlorosulfonation catalyst and under the influence of light. This invention is also concerned with the compounds made by the above process.

Previously, organosilicon compounds containing alkyl radicals attached to silicon have been treated with sulfuryl chloride in the presence of peroxide catalysts to chlorinate the alkyl radicals. I have now discovered that most organosilicon compounds containing alkyl radicals attached to carbon may be chlorosulfonated by treating these organosilicon compounds with sulfuryl chloride in the presence of catalytic amounts of a chlorosulfonation catalyst and under the influence of light. The result of the process of the present invention is to replace a hydrogen atom from an alkyl radical attached to silicon with a chlorosulfonyl radical and to form hydrogen chloride.

The process of the present invention is of value since it presents a one-step method of adding a polar radical to an organosilicon compound. The presence of such a polar radical in an organosilicon compound tends to make the compound insoluble in hydrocarbon solvents.

Chlorosulfonatable organosilicon compounds within the scope of the present invention include methyl silanes of the formula:

(1)  $(CH_3)_{4-a}Si(X)_a$ where X is halogen, e. g., fluorine, chlorine, bromine, etc., and $a$ has one of the following values: 0, 1. Methyl silanes within the scope of Formula 1 include tetramethylsilane, trimethylchlorosilane, trimethylfluorosilane, etc.

Other chlorosulfonatable silanes within the scope of the present invention include those of formula:

(2)  $(R_2)_{4-b}Si(R_1)_b$ where $R_1$ is an alkyl radical having more than one carbon atom, e. g., ethyl, propyl, isopropyl, butyl, octyl, decyl, octadecyl, etc., radicals; and $R_2$ is the same or different members selected from the class consisting of hydrogen, halogen, e. g., fluorine, chlorine, bromine, etc.; alkyl radicals, e. g., methyl, ethyl, propyl, butyl, amyl, octyl, etc., radicals; aryl radicals, e. g., phenyl, diphenyl, naphthyl, tolyl, xylyl, etc., radicals; aralkyl radicals, e. g., benzyl, phenylethyl, etc., radicals; and halogenated aryl radicals, e. g., chlorophenyl, dichlorophenyl, bromophenyl, etc., radicals; and $b$ is an integer equal to from 1 to 4, inclusive. Compounds within the scope of Formula 2 include, for example, tetraethylsilane, triethylchlorosilane, diethyldichlorosilane, ethyl trichlorosilane, ethyltrimethylsilane, dimethyldiethylsilane, tetrapropylsilane, triethylpropylsilane, butyltrichlorosilane, chlorophenyltriethylsilane, etc.

Chlorosulfonatable organosilicon compounds also include both linear and cyclic organopolysiloxanes having the recurring structural unit (3)  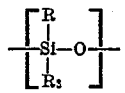

alone or intercondensed with other siloxane units where R is an alkyl radical, e. g., methyl, ethyl, propyl, butyl, etc., radicals; and $R_3$ is a member selected from the class consisting of alkyl radicals, e. g., methyl, ethyl, propyl, butyl, etc., radicals; aryl radicals, e. g., phenyl, diphenyl, etc., radicals; and halogenated aryl radicals, e. g., chlorophenyl, dichlorophenyl, bromophenyl, etc., radicals. Cyclic organopolysiloxanes within the scope of Formula 3 include, for example, the trimer, pentamer or tetramer of siloxane units such as dimethylsiloxane, methylphenylsiloxane, diethylsiloxane, methylchlorophenylsiloxane, etc. Linear organopolysiloxanes within the scope of Formula 3 include, for example, chain-stopped silicone oils containing the siloxane unit of Formula 3 alone or intercondensed with other siloxane units. Chain-stopped oils within the scope of Formula 3 would include methylsilicone oils, methylphenylsilicone oils, methylchlorophenylsilicone oils, etc.

As indicated by Formula 1, it is not possible to chlorosulfonate all methylsilanes. Apparently, the presence of halogen atoms attached to silicon in methylhalosilanes exerts a negative effect on the reaction, so that methylsilanes containing two or three chlorine atoms attached to silicon will not undergo chlorosulfonation. Both trimethylchlorosilane and tetramethylsilane undergo chlorosulfonation without difficulty, although the reaction with trimethylchlorosilane is not as rapid as with tetramethylsilane.

The inhibiting effect of chlorine atoms attached to silicon is not felt with silanes corresponding to Formula 2. In the case of ethyltrichlorosilane, chlorosulfonation occurs even though three chlorine atoms are present attached to silicon. With silanes of Formula 2, which may be described as having at least one alkyl radical containing more than one carbon atom attached to silicon, it is impossible to predict the location of the chlorosulfonyl radical. For example, when an attempt is made to chlorosulfonate ethyltrichlorosilane, the chlorosulfonyl radical may attach to either the alpha or the beta carbon of the ethyl radical or to both the alpha and the beta carbon. In cases where there is more than one alkyl radical attached to silicon, such as in diethyldichlorosilane, the sulfonyl chloride radical may be on the alpha or beta carbon of one or both of the ethyl radicals.

In the case of chlorosulfonation of hexamethyldisiloxane, when an attempt is made to effect reaction with sulfuryl chloride, the hydrogen chloride which is formed causes cleavage of the siloxane unit and liberation of water. This water tends to inhibit further chlorosulfonation so that the reaction will not proceed unless means are provided for removal of water as it is formed. In the case of other organopolysiloxanes (either cyclic or linear) which contain the recurring structural unit of Formula 3 either alone or intercondensed with other siloxane units, no cleavage of the siloxane units is observed and the reaction proceeds without regard for removal of any water which may be formed.

The chlorosulfonation catalysts used in the practice of the present invention are the well-known group of amine catalysts which are used in the chlorosulfonation of aliphatic hydrocarbon compounds [see M. S. Kharasch and A. T. Reed, J. Am. Chem. Soc. 61, 3089 (1939)]. These amine catalysts include, for example, pyridine, 2,6-diaminopyridine, quinoline, piperidine, morpholine, quinaldine, 2-mercaptothiazoline, isoquinoline, γ-picoline, tri-n-butylamine, etc.

The reaction of the present invention may be carried out by simply mixing the chlorosulfonatable organosilicon compound containing an alkyl radical attached to silicon with sulfuryl chloride and catalytic amounts of a chlorosulfonation catalyst and illuminating the reaction mixture by means of a standard incandescent lamp. Evolution of hydrogen chloride begins almost immediately upon beginning the illumination. The ratio of sulfuryl chloride to organosilicon compound is not critical. Either equimolar proportions of the two constituents may be used or a molar excess up to 100 fold or more of either component may be used. I have found it advantageous to use a molar excess of the organosilicon compound to insure that not more than one chlorosulfonyl radical is attached to silicon through aliphatic carbon per mole of organosilicon compound. Specifically, I have found that good yields are obtained by using 0.5 mole of sulfuryl chloride per mole of organosilicon compound. The percentage by weight of chlorosulfonation catalyst necessary to catalyze the reaction may also vary within wide limits. Suitable catalytic amounts have been found to be from about 0.0001 to 1.0% of the catalyst based on the weight of the other reactants. Additional catalyst may be used without having an adverse effect on the reaction, but the additional quantity is unnecessary. The source of illumination may vary within wide limits. Best results are obtained when the source of light includes radiation near the ultra-violet end of the spectrum, e. g., illumination from an incandescent or ultra-violet lamp. The intensity of illumination may also vary within extremely wide limits, it only being required that the light reach the reaction mixture. The reaction has been found to proceed satisfactorily at room temperature and under atmospheric pressure. After the reaction has taken place, as indicated by the termination of the evolution of hydrogen chloride, the chlorosulfonyl product may be separated from the reaction mixture by distillation.

Organosilanes containing sulfonyl chloride attached to silicon through aliphatic carbon which may be prepared by the method of the present invention include compounds of formula:

(4) $(CH_3)_{3-a}(X)_a SiCH_2SO_2Cl$ where X and a are as defined above. Sulfonyl chloride compounds within the scope of Formula 4 are $(CH_3)_3SiCH_2SO_2Cl$ $(CH_3)_2(Cl)SiCH_2SO_2Cl$ $(CH_3)_2(Br)SiCH_2SO_2Cl$ etc.

Sulfonyl chlorides which contain alkyl radicals other than methyl attached to silicon which are within the scope of the present invention include compounds of the formula:

(5) $(R_2)_3Si(C_nH_{2n}SO_2Cl)$ where $R_2$ is as defined above and n is an integer greater than 1, e. g., from 2 to 20, or more. Compounds within the scope of Formula 5 include, for example, $(C_2H_5)_3SiC_2H_4SO_2Cl$, $(C_2H_5)_2(Cl)SiC_2H_4SO_2Cl$ $(C_2H_5)(Cl)_2SiC_2H_4SO_2Cl$, $Cl_3SiC_2H_4SO_2Cl$ $(CH_3)_3SiC_2H_4SO_2Cl$, $(CH_3)_2(C_2H_5)SiC_2H_4SO_2Cl$ $(C_3H_7)_3SiC_3H_6SO_2Cl$, $(C_2H_5)_3SiC_3H_6SO_2Cl$ $Cl_3SiC_4H_8SO_2Cl$, $(C_{16}H_{33})(Cl)_2SiC_{16}H_{32}SO_2Cl$ $(C_6H_5)_2(CH_3)SiC_2H_4SO_2Cl$ etc.

Sulfonyl chlorides containing siloxane units include, for example, both cyclic and linear organopolysiloxanes having the recurring structural units:

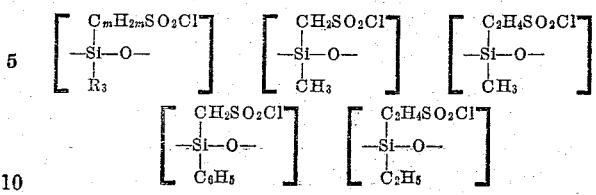

etc., either alone or intercondensed with other siloxane units were. m is an integer equal to from 1 to 20 or more and $R_3$ is as defined above. Specific examples of cyclic organopolysiloxanes containing a chlorosulfonyl radical attached to silicon through aliphatic carbon include, for example,

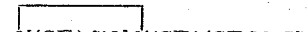

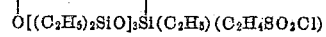

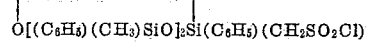

The following examples are illustrative of the practice of my invention and are not intended for purposes of limitation.

*Example I*

A mixture of 88 grams (1.0 mole) of tetramethylsilane, 67 grams (0.5 mole) of sulfuryl chloride, and 5 drops of pyridine were placed in a Pyrex flask equipped with a Dry Ice condenser. The mixture was illuminated by a 1500 watt lamp placed approximately ten inches from the flask. Evolution of hydrogen chloride began immediately. After illumination had continued for one and one-quarter hours, the volatile material was stripped off under vacuum and the residue was fractionally distilled at approximately 2 mm., yielding 30.4 grams of $(CH_3)_3SiCH_2SO_2Cl$ which boiled between 72 and 74° C. at 2 mm. and had a refractive index $n_D^{20}$ 1.4680. This fraction was analyzed and found to contain 25.9% carbon, 6.1% hydrogen, 17.2% sulfur, and 15.1% silicon. (Theoretical: 25.8% carbon, 5.9% hydrogen, 17.2% sulfur and 15.0% silicon.)

*Example II*

A mixture of 592 grams (2.0 moles) of octamethylcyclotetrasiloxane, 135 grams (1.0 mole) of sulfuryl chloride, and 0.5 ml. of pyridine was placed in a flask and illuminated for one hour with a 1500 watt tungsten-filament lamp. Volatiles were stripped from the reaction mixture and fractional distillation of the residue yielded 115.0 grams of

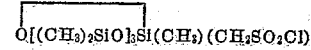

which boiled between 108 and 110° C. at 1 mm. and had a refractive index $n_D^{20}$ 1.4350. Chemical analysis of the product showed it to contain 8.1% sulfur and 9.3% chlorine. (Theoretical: 8.1% sulfur, 9.0% chlorine.)

*Example III*

A mixture of 157 grams (1.0 mole) of diethyldichlorosilane, 68 grams (0.5 mole) of sulfuryl chloride, and 0.5 ml. of pyridine was added to a flask and irradiated with a 1500 watt lamp located four inches from the reaction flask. After four and one-half hours volatiles were removed from the reaction mixture and the residue was vacuum distilled, yielding 27.7 grams of $(C_2H_5)(Cl)_2SiC_2H_4SO_2Cl$ which boiled at 82 to 87° C. at 0.5 to 1 mm. The product had a neutral equivalent of 66. (Theoretical: 64.) Chemical analysis showed the product to contain 42.1% chlorine. (Theoretical: 41.8% chlorine.)

Example IV

A mixture of 180 grams (1.67 moles) of trimethylchlorosilane, 112 grams (0.83 mole) of sulfuryl chloride and 0.5 ml. of pyridine was placed in a flask and illuminated by means of a 1500 watt tungsten filament lamp located at a distance of six inches from the reaction flask. Reaction started within fifteen minutes and was completed in approximately one hour. The reaction mixture was then stripped of volatiles and fractionally distilled to yield 29.6 grams of $(CH_3)_2(Cl)SiCH_2SO_2Cl$ which boiled between 70 and 73° C. at 1 mm. and had a refractive index $n_D^{20}$ 1.4780. Chemical analysis of the product showed it to contain 15.3% sulfur and 34.5% chlorine. (Theoretical: 15.4% sulfur, and 34.3% chlorine.) The neutral equivalent of the product was found to be 69 which is the theoretical value.

Example V

A mixture of 163 grams (1.0 mole) of ethyltrichlorosilane, 68 grams (0.5 mole) of sulfuryl chloride, and 1 ml. of pyridine was placed in a reaction flask and irradiated with a 1500 watt incandescent lamp located six inches from the flask. Irradiation was carried on for one and one-half hours when the reaction had been completed. Volatiles were stripped from the reaction mixture and the residue was fractionally distilled to yield 21.3 grams of $Cl_3SiC_2H_4S(O)_2Cl$ which boiled at 71° C. at 4 mm. and melted at 29 to 30° C. Chemical analysis of the product showed it to contain 53.0% chlorine and to have a neutral equivalent of 51.3. (Theoretical: 54.3% chlorine; neutral equivalent, 52.5.)

Example VI

A mixture of 291 grams of a chain-stopped methylsilicone oil having a viscosity of about 40 centistokes at 100° F., 68 grams (0.5 mole) of sulfuryl chloride, and 0.5 ml. of pyridine was placed in a flask and irradiated with a 1500 watt tungsten filament lamp located four inches from the flask. Hydrogen chloride was evolved slowly. After two and one-half hours the mixture was filtered from a small amount of solid and heated for four hours in a stream of dry air at 50° C. and 1 mm. to remove volatile materials. The oil was then shaken with anhydrous sodium sulfate and precipitated calcium carbonate and filtered. Chemical analysis showed 3.9% sulfur and 5.2% chlorine, indicating that approximately one chlorosulfonyl group was introduced for each ten silicon atoms.

Example VII

A mixture of 63 grams of an ethylsilicone oil having an average chain length of about 25 diethylsiloxane units, 13.9 grams (0.1 mole) of sulfuryl chloride and 0.5 ml. of pyridine was added to a flask and irradiated with a 1500 watt tungsten filament lamp at a distance of about 10 inches from the flask. Illumination was continued for four and one-half hours and the oil was then heated in vacuum to remove volatiles. The oil was then shaken with anhydrous sodium sulfate and precipitated calcium carbonate and filtered. Chemical analysis showed 1.2% sulfur and 5.6% chlorine indicating that approximately one chlorosulfonyl group was introduced for each 25 silicon atoms.

The sulfuryl chlorine derivatives of the present invention are useful in the preparation of organosilicon oils, gums and resins, which may be used as hydraulic fluids, lubricants, molding materials and coating materials.

The chlorosulfonyl compounds of the present invention may be converted to sulfonamides by reaction with anhydrous ammonia in anhydrous solution. For example, the sulfonamides of both the sulfuryl chloride derivative of tetramethylsilane and the sulfuryl chloride derivative of octamethylcyclotetrasiloxane have been prepared by treating the chlorosulfonyl derivatives with anhydrous ammonia in benzene solution.

The chlorosulfonyl compounds of the present invention may also be prepared by passing chlorine and sulfur dioxide into organosilicon compounds within the scope of Formulas 1, 2 and 3 while subjecting the organosilicon compound to ultraviolet radiation. However, I prefer to use the sulfuryl chloride method of the present invention because of the ease of reaction.

What I claim as new and desire to secure by Letters Patent of the United States is:

1. The process of making organosilicon compounds containing a chlorosulfonyl radical attached to silicon through aliphatic carbon which process comprises effecting reaction between (1) an organosilicon compound selected from the class consisting of (A) $(CH_3)_{4-a}Si(X)_a$ where X is halogen and $a$ is one of the following: 0, 1; (B) $(R_2)_{4-b}Si(R_1)_b$ where $R_1$ is an alkyl radical having more than one carbon atom and $R_2$ represents members selected from the class consisting of hydrogen, halogen, alkyl radicals, aryl radicals, aralkyl radicals, halogenated aryl radicals, and mixtures of the aforesaid members; and $b$ is an integer equal to from 1 to 4, inclusive, and (C) organopolysiloxanes containing the recurring structural unit

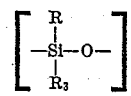

where R is an alkyl radical and $R_3$ is a member selected from the class consisting of alkyl radicals, aryl radicals, aralkyl radicals, and halogenated aryl radicals; and (2) sulfuryl chloride in the presence of catalytic amounts of an amine chlorosulfonation catalyst while subjecting the reaction mixture to illumination.

2. The process of forming organosilicon compounds containing a chlorosulfonyl radical attached to silicon through aliphatic carbon which process comprises effecting reaction between (1) an organosilicon compound having the formula

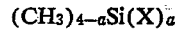

where X is halogen and $a$ is one of the following: 0, 1; and (2) sulfuryl chloride in the presence of catalytic amounts of an amine chlorosulfonation catalyst while subjecting the reaction mixture to illumination.

3. The process of forming organosilicon compounds containing a chlorosulfonyl radical attached to silicon through aliphatic carbon which process comprises effecting reaction between (1) an organosilane having the formula:

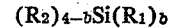

where $R_1$ is an alkyl radical having more than one carbon atom and $R_2$ represents members selected from the class consisting of hydrogen, halogen, alkyl radicals, aryl radicals, aralkyl radicals, halogenated aryl radicals, and mixtures of the aforesaid members, and $b$ is an integer equal to from 1 to 4, inclusive, and (2) sulfuryl chloride in the presence of catalytic amounts of an amine chlorosulfonation catalyst, while subjecting the reaction mixture to illumination.

4. The process of forming organosilicon compounds containing a chlorosulfonyl radical attached to silicon through aliphatic carbon which process comprises effecting reaction between (1) an organopolysiloxane having the recurring structural unit

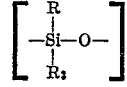

where R is an alkyl radical and $R_3$ is a member selected from the class consisting of alkyl radicals, aryl radicals, aralkyl radicals, and halogenated aryl radicals and (2) sulfuryl chloride in the presence of catalytic amounts of an amine chlorosulfonation catalyst, while subjecting the reaction mixture to illumination.

5. The method of forming $(CH_3)_2(Cl)SiCH_2SO_2Cl$ which comprises effecting reaction between (1) trimethylchlorosilane and (2) sulfuryl chloride in the presence of catalytic amounts of pyridine while subjecting the reaction mixture to illumination.

6. The process of forming $(C_2H_5)(Cl)_2SiC_2H_4SO_2Cl$ which process comprises effecting reaction between diethyldichlorosilane and sulfuryl chloride in the presence of catalytic amounts of pyridine while subjecting the reaction mixture to illumination.

7. The method of forming $Cl_3SiC_2H_4SO_2Cl$ which comprises effecting reaction between ethyltrichlorosilane and sulfuryl chloride in the presence of catalytic amounts of pyridine while subjecting the reaction mixture to illumination.

8. The process of making

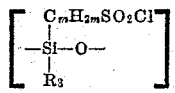

which process comprises effecting reaction between octamethylcyclotetrasiloxane and sulfuryl chloride in the presence of catalytic amounts of pyridine and under the influence of illumination.

9. Organosilicon compounds selected from the class consisting of (A) methylsilanes having the formula:

$$(CH_3)_{3-a}(X)_a SiCH_2SO_2Cl$$

where X is halogen and $a$ is one of the following: 0, 1; (B) organosilanes having the formula:

$$(R_2)_3SiC_nH_{2n}SO_2Cl$$

where $R_2$ represents members selected from the class consisting of hydrogen, halogen, alkyl radicals, aryl radicals, aralkyl radicals, halogenated aryl radicals, and mixtures of the aforesaid members, and $n$ is an integer equal to from 2 to 20, inclusive, and (C) organopolysiloxanes containing the structural unit

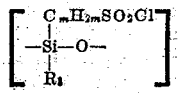

where $R_3$ is a member selected from the class consisting of alkyl radicals, aryl radicals, aralkyl radicals, and halogenated aryl radicals, and $m$ is an integer equal to from 1 to 20, inclusive.

10. Methylsilanes corresponding to the formula:

$$(CH_3)_{3-a}(X)_a SiCH_2SO_2Cl$$

where X is halogen and $a$ is one of the following: 0, 1.

11. Organosilanes corresponding to the formula:

$$(R_2)_3SiC_nH_{2n}SO_2Cl$$

where $R_2$ represents members selected from the class consisting of hydrogen, halogen, alkyl radicals, aryl radicals, aralkyl radicals, halogenated aryl radicals, and mixtures of the aforesaid radicals, and $n$ is an integer equal to from 2 to 20, inclusive.

12. Organopolysiloxanes having the structural unit

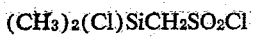

where $R_3$ is a member selected from the class consisting of alkyl radicals, aryl radicals, aralkyl radicals, and halogenated aryl radicals, and $m$ is an integer equal to from 1 to 20, inclusive.

13. Dimethylchlorosilylmethanesulfonyl chloride $$(CH_3)_2(Cl)SiCH_2SO_2Cl$$

14. Ethyldichlorosilylethanesulfonyl chloride $$(C_2H_5)(Cl)_2SiC_2H_4SO_2Cl$$

15. Trichlorosilylethanesulfonyl chloride $$Cl_3SiC_2H_4SO_2Cl$$

16. Heptamethylcyclotetrasiloxanylmethanesulfonyl chloride

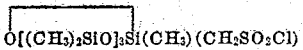

17. A liquid, linear organopolysiloxane containing at least one chlorosulfonyl radical attached directly to silicon through aliphatic carbon, the remaining valences of silicon, other than the valences which make up the siloxane chain, being satisfied by alkyl radicals.

References Cited in the file of this patent

UNITED STATES PATENTS 2,454,759    Safford    Nov. 30, 1948

OTHER REFERENCES

Kharasch et al.: "Jour. Am. Chem. Soc.," vol. 61 (1939), pp. 3089–92.

Sommer et al.: "Jour. Am. Chem. Soc.," vol. 68 (1946), pp. 485–7.

Larsson, "Chalmers Tek. Hog. Handlingas," vol. 79 (1948), page 20.